US012604196B2

(12) United States Patent　　　　(10) Patent No.: US 12,604,196 B2
Sangle-Ferriere　　　　　　　　　　(45) Date of Patent: Apr. 14, 2026

(54) METHOD FOR CERTIFYING THE GEOLOCATION OF A RECEIVER

(71) Applicant: MARBEUF CONSEIL ET RECHERCHE, Paris (FR)

(72) Inventor: Bruno Sangle-Ferriere, Paris (FR)

(73) Assignee: MARBEUF CONSEIL ET RECHERCHE, Paris (FR)

( * ) Notice: Subject to any disclaimer, the term of this patent is extended or adjusted under 35 U.S.C. 154(b) by 612 days.

(21) Appl. No.: 17/676,493

(22) Filed: Feb. 21, 2022

(65) Prior Publication Data

US 2022/0272080 A1　　　Aug. 25, 2022

(30) Foreign Application Priority Data

Feb. 22, 2021　　(FR) ....................................... 2101709

(51) Int. Cl.
H04W 12/63　　　(2021.01)
G01S 19/21　　　(2010.01)
G06F 21/62　　　(2013.01)
G06Q 20/40　　　(2012.01)
　　　　　　(Continued)

(52) U.S. Cl.
CPC ........... H04W 12/63 (2021.01); G01S 19/215 (2013.01); G06F 21/62 (2013.01); G06Q 20/4015 (2020.05); H04L 9/3247 (2013.01); H04W 12/104 (2021.01)

(58) Field of Classification Search
CPC ... H04W 12/63; H04W 12/104; G01S 19/215; G01S 19/00; G01S 5/0045; G01S 5/02;

G06F 21/62; G06Q 20/4015; H04L 9/3247; H04L 63/123; H04L 67/52
See application file for complete search history.

(56) References Cited

U.S. PATENT DOCUMENTS 8,068,534 B2 * 11/2011 Levin ..................... H04B 1/707
　　　　　　　　　　　　　　　　375/147
2014/0108800 A1 * 4/2014 Lawrence ............. H04L 63/123
　　　　　　　　　　　　　　　　713/168

(Continued)

FOREIGN PATENT DOCUMENTS

CN　　　104035068 B　　9/2016
JP　　　　4518653 B2　　8/2010

(Continued)

OTHER PUBLICATIONS

Notice of Allowance issued for U.S. Appl. No. 17/676,498, mailed Apr. 15, 2024 (7 pages).

(Continued)

*Primary Examiner* — Brian F Shaw
(74) *Attorney, Agent, or Firm* — Jason A. Smith; Shumaker, Loop & Kendrick, LLP

(57) ABSTRACT

A method for certifying the geolocation of a receiver, including, prior to said certification, receiving, at predetermined times, in addition to the geolocation signals emitted by a plurality of emitters and used to compute said geolocation, a predetermined number of additional electromagnetic signals emitted by the same emitters and including data used to authenticate the geolocation, the method comprising determining the authenticity of the geolocation on the basis of the additional electromagnetic signals.

8 Claims, 5 Drawing Sheets

(51) Int. Cl.
   *H04L 9/32*       (2006.01)
   *H04W 12/104*    (2021.01)

(56) References Cited

U.S. PATENT DOCUMENTS

| | | | |
|---|---|---|---|
| 2014/0206279 A1* | 7/2014 | Immendorf | H04K 3/42 |
| | | | 455/1 |
| 2016/0095082 A1* | 3/2016 | Lee | H04L 63/0846 |
| | | | 455/456.1 |
| 2017/0006417 A1 | 1/2017 | Canoy et al. | |
| 2017/0250986 A1 | 8/2017 | Vajjhala et al. | |
| 2018/0278349 A1 | 9/2018 | Zhihua et al. | |
| 2019/0110197 A1 | 4/2019 | South | |
| 2020/0107164 A1 | 4/2020 | Lopatin et al. | |
| 2020/0322805 A1 | 10/2020 | Wang et al. | |

FOREIGN PATENT DOCUMENTS

| | | | |
|---|---|---|---|
| RU | 2678371 C2 | 1/2019 |
| WO | 03042713 A2 | 5/2003 |
| WO | 2011068838 A1 | 6/2011 |
| WO | 2017086736 A1 | 5/2017 |

OTHER PUBLICATIONS

Anonymous: "Loran-C—Wikipedia", Jan. 24, 2021, XP055860105; https://en.wikipedia.org/w/index.php?title=Loran-C&oldid= 1002549095.

Anonymous: "Omega (navigation system)—Wikipedia", Jan. 19, 2021, pp. 1-9, XP055860102; https://en.wikipedia.org/w/index.php? titlle=Omega_(navigation-system)&oldid=1001447165.

Non-Final Office Action (NFOA) issued for U.S. Appl. No. 17/676,498, mailed Jan. 30, 2024 (10 pages).

\* cited by examiner

201

202

301

302

303

METHOD FOR CERTIFYING THE GEOLOCATION OF A RECEIVER

TECHNICAL FIELD

The present invention relates to a method for certifying the geolocation of a receiver.

The invention also relates to a receiver, to a system and to applications using such a method.

BACKGROUND

It is known practice to use satellite positioning systems to geolocate a receiver, ascertain its speed therefrom or broadcast the time by measuring the propagation times of electromagnetic waves emitted by a set of satellites in a constellation. One of the drawbacks of these systems, in addition to their inaccuracy, is that the various elements, satellites and receiver, need to be in direct visibility. In urban and wooded environments, the insides of buildings and underground, this constraint is not complied with. Specifically, computing the position is based on a hypothesis that electromagnetic signals propagate in a direct line between the emitting satellites and the receivers, and this therefore proves to be difficult or even impossible when the signals are blocked or significantly attenuated by the environment of the receiver. These systems then operate in downgraded mode, or no longer operate.

Moreover, such systems require the launching and maintenance of numerous satellites, which are vulnerable to attacks or to collisions with satellite debris.

A further problem is that these systems may have their accuracy altered by climatic conditions and by ionizing rays originating from the Sun that are stopped by the atmosphere.

Finally, electromagnetic signals originating from these satellites are able to be imitated for fraudulent purposes without too much difficulty. This threat poses significant security problems, in particular with regard to applications requiring certification of the geographical position of the receiver, such as for example secure transactions. Indeed, the temporal and spatial location data for a transaction may be used to certify it. However, this requires being able to guarantee the integrity of this location.

One system, known as BOX NTP BiaTime, makes it possible to certify a time, but requires a connection to a data network such as the Internet. Likewise, the SCP Time system makes it possible to certify a time, but using a bidirectional communication between the emitter and the receiver of the time, and therefore bidirectional communication means, essentially through a wired or wireless computer network.

On the other hand, in order to secure transactions, particularly banking transactions, methods based on the geolocation of their terminals have been proposed. These methods aim to locate the terminal of the transaction. The terminal can correspond to a smartphone, a computer, or even a tablet. Thus, these methods make it possible to detect fraudulent transactions by identifying a difference in geographical area, between the location expected for the transaction and that where the terminal is located.

These methods are highly dependent on the geolocation system used. As mentioned previously, current systems may have their accuracy altered by climatic conditions and by ionizing rays originating from the Sun that are stopped by the atmosphere. Furthermore, electromagnetic signals originating from these satellites are able to be imitated for fraudulent purposes without too much difficulty. Current systems therefore do not guarantee the integrity of transactions in all circumstances.

There is still more generally a need to improve the geolocation of receivers and to make the data relating to this geolocation more reliable.

SUMMARY

The invention aims to address this need, and relates, according to a first of its aspects, to a method for certifying the geolocation of a receiver, comprising, prior to said certification, receiving, at predetermined times, in addition to the geolocation signals emitted by a plurality of emitters and used to compute said geolocation, a predetermined number of additional electromagnetic signals emitted by the same emitters and comprising data used to authenticate the geolocation, the method comprising determining the authenticity of the geolocation on the basis of the additional electromagnetic signals.

Preferably, the electromagnetic signals are emitted at a fixed repetition frequency and therefore at foreseeable times for the clock of the emitters and are received in a manner offset from one another, spaced by time differences that are known with an uncertainty that depends in particular on the distance at which the emitter may be located from the receiver, on their maximum relative speed and on maximum propagation speed differences between the signals in the environments through which they travel, all of these physical uncertainties making it possible to determine a time between two dates of the clock of the receiver for the reception of the signals. As an alternative, the signals may be emitted at predetermined dates or at predetermined but variable emission frequencies, these date or frequency schedules advantageously being able to be modified and communicated by any communication means using preferably signed messages, or else again as an alternative any signal emitted by an emitter possibly comprising the emission date of the following signal or a time lapse during which the following signal might be emitted.

Preferably, the additional electromagnetic signals each comprise a digital signature.

A "digital signature" is understood to mean a mechanism for guaranteeing the integrity of an electronic message and authenticating the author thereof, for example a hash of said message, encrypted by a cryptographic key such as the private key of an asymmetric key pair, or a key shared between the author and the intended recipient of said message, such as a single-use key, or even such a signature of said message after this has been mixed with a number known only to the author and to the intended recipient. The digital signature of a datum may consist of the hash of the datum mixed with a secret number known during the verification of said signature to the apparatus performing this signature verification.

"Geolocation" is understood to mean the position of the receiver, in particular its coordinates in an absolute reference frame or in a local reference system.

The invention offers a simple, inexpensive and effective solution for certifying the geolocation of the receiver. By using additional certification signals in addition to the signals used to compute the position of the receiver, the method makes it possible to reduce or even to eliminate error sources and in particular makes it possible to prevent the use of fraudulent geolocation signals, as will be described further below.

The invention proves to be useful for applications requiring the position of the receiver to be certified, in particular in the context of secure transactions, licenses or rights, or else in the context of tracking goods or synchronizing computer systems or any sort of clock with the clock of emitters.

Geolocation, Certification and Information Signals

In one preferred embodiment, some of the additional electromagnetic signals accompany the geolocation signals and are called "information signals". The information signal accompanying a geolocation signal comprises data relating to the position of the emitter of said geolocation signal and/or an identifier providing information about the position of said emitter, the information signal preferably comprising temporal information for identifying the date and time of emission of said geolocation signal. The information signal may be received before, after or at the same time as the reception of the geolocation signal.

In this embodiment, some of the additional electromagnetic signals are received following the geolocation signals and are called "certification signals". Preferably, the method comprises the receiver receiving, within a predetermined duration, a predefined number of certification signals following the geolocation signals used to compute said geolocation.

"Certification signal" means a verification signal that allows to verify the authenticity and integrity of the electromagnetic signals used to calculate geolocation.

The information signal may furthermore comprise weather data providing information about the weather, in particular pressure, cloud coverage, temperature, hygrometry in an area surrounding the emitter, and/or speed data providing information about the propagation speeds of electromagnetic waves in directions and at distances in which the geolocation signal is liable to be used. Using weather data may make it possible to take into account disruptions liable to be experienced by the geolocation signals and/or the certification signals on their path from their emitter to the receiver. This information makes it possible in particular to increase the accuracy in terms of computing the geolocation.

The information signal may furthermore comprise information indicating the time at which the one or more following certification signals should be emitted.

The certification and information signals may each comprise a digital signature of the transported data.

In one embodiment, the certification signals correspond to information signals.

The geolocation signals may be integrated into the information signals.

The geolocation signal and the information signal may thus correspond to a single electromagnetic signal.

The geolocation, information and certification signals may be emitted at the same fixed, in particular repetition frequency. However, the information signals may also be emitted in cycles different from those of the certification signals.

The geolocation signal, the certification signal and the certification signals originating from the same emitter may be emitted at different frequencies.

Preferably, the method comprises transmitting in parallel of several certification and/or information signals on different wavelengths, in particular wavelengths close to the wavelength of the geolocation signal. This can shorten the time it takes to send said information and certification signals. This is particularly useful when the signal frequency is low or when the information or certification signals contain a large volume of data.

The geolocation signals may be emitted on different wavelengths. In particular, these geolocation signals may originate from at least two different emitters at different frequencies and coincide in time.

At least one geolocation signal may have a frequency less than 1 GHz, preferably in the long-wave range, in particular have a frequency between 3 kHz and 300 kHz.

Preferably, the geolocation and certification signals have a frequency between 30 MHz and 3 GHz, corresponding to wavelengths between 10 cm and 10 m.

The geolocation signals and the certification signals may each correspond to GPS (Global Positioning System) signals, in particular having a frequency L1 or L2, corresponding to 1575.42 MHz and 1227.60 MHz, respectively. The certification method according to the invention may thus be implemented using any GPS system. This then results in a simple and effective method for certifying the receiver that is compatible with existing GPS systems.

As a variant or in addition, at least one geolocation signal has a frequency belonging to the HF, VHF, UHF, FM or TV bands.

The FM band comprises electromagnetic signals having a frequency between around 88 and 108 MHz.

The VHF band comprises electromagnetic signals having a frequency between 30 MHz and 300 MHz.

The UHF band comprises electromagnetic signals having a frequency between 300 MHz and 3000 MHz.

The HF band comprises electromagnetic signals having a frequency between 3 MHz and 30 MHz.

The TV band comprises electromagnetic signals having a frequency between 30 and 3000 MHz.

The geolocation and/or certification signals may originate from emitters arranged on a satellite, a flying object, or an object that floats in the sky.

The geolocation signals may for example be emitted by satellites in geostationary orbit or moving around the Earth.

At least one of the emitters may be terrestrial, in particular arranged on a tower.

In one preferred embodiment, the geolocation and/or certification signals originate from terrestrial emitters, in particular emitters arranged at altitude or on top of buildings such as towers, or even underwater for frequencies less than 10 MHz. Such an arrangement makes it possible to increase in particular the vertical accuracy of the geolocation and the measurement of the transmission speed.

Verification of the Geolocation Signals

The method may comprise, for at least one geolocation signal, emitted by an emitter of the plurality of emitters, the steps of:

verifying the authenticity of said geolocation signal, in particular that of the information signal accompanying the geolocation signal, using one or more inspection terminals, and in the event of a negative outcome, triggering a predefined action for fraudulent signals so as to perform at least one of the following actions:

prevent the sending of at least one certification signal used to certify the geolocation computed with said fraudulent signal, incorporate, into the information signal accompanying the geolocation signal and to be emitted following the fraudulent geolocation signal, or into at least one of the certification signals, and preferably the first certification signal expected following the fraudulent geolocation signal with a view to the certification, information indicating that the fraudulent geolocation signal and/or that the information signal accompanying it is or are fraudulent, prevent, or force the prevention, in particular through jamming, the receiver from receiving one of the certification signals, and preferably the first certification signal emitted following the fraudulent geolocation signal and expected by the receiver for the certification.

Verification of the Certification Signals

The method may comprise, for at least one certification signal emitted by an emitter of the plurality of emitters, steps of:

verifying the authenticity of said certification signal, in particular using one or more inspection terminals, and in particular its signature and the fact that said certification signal should not certify a fraudulent geolocation signal, in the event of a negative outcome, triggering a predefined action for erroneous certification signals so as to perform at least one of the following actions:

prevent preferably the emitter referenced by the erroneous certification signal from sending at least one other certification signal to be emitted following the erroneous certification signal and used to certify the geolocation computed using the fraudulent geolocation signal or able to be certified using the erroneous certification signal, incorporate, into at least one of the certification signals to be emitted following the erroneous certification signal, information indicating that said erroneous certification signal cannot be used to certify the geolocation, prevent, or force the prevention, in particular through jamming, the receiver from receiving at least one other certification signal required to certify the geolocation computed using the fraudulent geolocation signal, or able to be certified using the erroneous message.

Verification of the Authenticity of the Geolocation Signals by the Inspection Terminals The inspection terminals are geolocation signal receivers, and preferably certification signal receivers, communicating with or linked to geolocation or certification signal receivers and/or jamming stations.

The authenticity of a geolocation signal may be verified by each inspection terminal by:

verifying the digital signature contained in the information signal accompanying the geolocation signal, computing an average transmission speed of the geolocation signal, between the emitter and the inspection terminal, comparing said computed average transmission speed with a range of possible transmission speeds.

It is possible to send, in particular in the information signals, to the one or more inspection terminals, data regarding the transmission speed of the electromagnetic waves between the emitter and the sites where the signal is liable to be used by the receiver, in particular minimum and maximum average transmission speeds, or weather data including in particular atmospheric pressure, temperature and hygrometry of the spaces traveled through by the geolocation or certification signal and then determine the range of possible transmission speeds on the basis of these data. As an alternative, the inspection terminals, or some of them, may collect these data independently, for example by interrogating a computer server.

If the procedure makes provision to send information indicating the detection of fraudulent signals to an emitter station or to a jamming station, a method for detecting any incorrect operation in the sending of such information is preferably put in place, and is able for example, after possible verification that a signal that might have been detected as fraudulent has not otherwise been detected as valid, to trigger the procedure provided in the event of detecting fraudulent messages.

The signature is verified for example by computing the hash of said signal from which the signature attached thereto has been removed beforehand, by decrypting the attached signature, itself consisting of the encrypted hash, and by comparing the computed hash with the product of the decryption of the signature.

The authenticity of a geolocation signal or of a certification signal may be verified by an inspection terminal that is not fixed by first using other geolocation signals to compute a certified position of said mobile terminal, and then, taking into account the uncertainty on its own position, verifying the authenticity of the new geolocation signal or of a certification signal.

Verification of the Authenticity of the Certification Signals

The inspection terminals verify the authenticity of a certification signal by receiving the certification signal at allotted times, that is to say for example after the supposed emission date of said signal and before the supposed date when said signal might reach the maximum range at which it may be used, verifying the digital signature of said certification signal, receiving the geolocation signal that said certification signal is able to certify, verifying the authenticity of said geolocation signal.

Predefined Action of the Inspection Terminals

As described above, when the verification of a geolocation or certification signal is negative, a predefined action for fraudulent geolocation signals or for erroneous certification signals is triggered for the one or more geolocation signals to which they relate.

As mentioned above, the predefined action may be intended to prevent the emitter from sending the certification signal following the fraudulent geolocation signal or following the erroneous certification signal or to prevent the receiver from receiving this certification signal. In this case, the predefined action for fraudulent signals may be jamming the certification signal following the fraudulent or erroneous signal expected by the receiver in order to authenticate the geolocation using for example one or more jamming stations that are associated or connected in a network.

The jamming may be limited to an area defined by:

i. the position of the emitter of the fraudulent geolocation signal, computed in particular by triangulation or trilateration using the inspection terminals, and by:

ii. either the range deduced both from the position of the emitter of the fraudulent geolocation signal, its observed power upon reception thereof by the one or more inspection terminals and the minimum reception power associated with said fraudulent geolocation signal, be this either generic, for example associated with the emitter and with the wavelength, or specific, that is to say inscribed in the information signal accompanying the geolocation signal, iii. or the range of the fraudulent geolocation signal, based on its emitter, as inscribed in the information signal associated therewith or otherwise associated with said fraudulent information message, iv. or the intersection of the two areas defined above in ii) and iii).

The jamming may take place over a wider area comprising the area identified above.

The minimum threshold may be predetermined for an emitter of the plurality of emitters, for a subgroup of these emitters, or one of these emitters, below which threshold the receiver is not able to use said certification signal to authenticate the geolocation signal. This threshold is advantageously attached to the message accompanying the geolocation signal or the certification signal to which it applies.

The Inspection System

Hereinafter, an "inspection system" is understood to mean the assembly formed by the inspection terminals and the jamming stations.

Preferably, the inspection system furthermore comprises a self-inspection system by way of which any operating fault with the inspection system gives rise to a predefined self-inspection action.

The operating fault with the inspection system may for example correspond to:

a failure of one of the inspection terminals, a failure of a jamming station, a failure of the communication network used by the inspection terminals, an inspection terminal detecting the lack of operation of the predefined action for fraudulent signals triggered by another inspection terminal, another inspection terminal detecting a fraudulent signal that did not give rise to a predefined action for fraudulent signals.

Hereinafter, "a faulty inspection terminal" corresponds to a terminal exhibiting an operating fault as described above.

Each inspection terminal may compute an area, called "non-inspection area", in which the imprecise geolocation signal cannot be detected or in which the predefined action, in particular jamming of the fraudulent signal, cannot be performed.

Each inspection terminal may compute an area, called "inspection area", in which the fraudulent geolocation or certification signal is able to be detected and for which the predefined action, in particular jamming of the fraudulent signal, is able to be performed.

Preferably, the inspection terminals, jamming stations and emitters are connected in a network; for example by a 4G, 5G, Internet, Lora, Sigfox network or any other communication means. The inspection terminals are preferably fixed and temporally synchronized. The jamming stations may be combined with the inspection terminals and make it possible to jam electromagnetic signals emitted by the emitters, in particular the geolocation and/or certification signals.

The predefined self-inspection action is preferably that of attaching, to the geolocation signals, in particular by indicating in the information signals, information regarding their non-inspection areas and/or their inspection areas, in particular by indicating the coordinates of the centers of the areas and a parameter providing information about their extent, for example the radius. As an alternative or in addition, the predefined self-inspection action may correspond to attaching, to one or more geolocation signals emitted by an emitter, in particular in the information signal accompanying it, information for indicating that one or more inspection terminals is not or are not connected to this emitter.

In some cases, the predefined self-inspection action may attach, to the geolocation signals, in particular in the information signals accompanying the geolocation signals, information regarding areas corresponding to areas of overlap between one or more non-inspection areas and inspection areas; with some inspection terminals possibly being faulty while others are still valid, a signal located both in an inspection area and in a non-inspection area is considered to be inspected by the receivers and therefore able to be used to compute and certify a geolocation.

When the emitters use varied wavelength ranges, only the geolocation signals sent with wavelengths in the range of the signals detected by the one or more faulty inspection terminals preferably carry this information.

The inspection terminals may be designed to compute the position of an emitter based on the geolocation signals emitted by this emitter:

compare the computed position of the emitter with a reference position, the reference position corresponding to a position transmitted by said emitter and/or to a position stored beforehand in a database able to be accessed by the inspection terminals, detect a change in position of the emitter on the basis of this comparison, transmit, in particular by way of the emitter or by way of another emitter, information relating to the position or to the change in position of this emitter to the server or to said emitter.

Computing of the Position by the Receiver

Preferably, the position is computed only using geolocation signals for which the authenticity, in particular the integrity of the associated data, in particular their digital signature, has been verified, as is described above.

In one embodiment, the receiver has a clock synchronized with the emitters and computes its position by:

determining the propagation times of the geolocation signals from the emitters and to the receiver, computing the distances between the receiver and the emitters based on these propagation times, and determining the position of the receiver using a localization technique, in particular triangulation and/or trilateration technique, on the basis of the computed distances.

A description will be given below of one example of a method that may be used to compute the geolocation when the receiver does not have a clock synchronized with the emitters. In this embodiment, the receiver is specifically located at M on a hyperbolic surface revolving about the axis $M_1M_2$, where the points $M_1$ and $M_2$ are the positions of emitters emitting received geolocation electromagnetic signals, the hyperbola, in a plane containing the axis M1M2, being defined by the position of the points $M_1$ and $M_2$ and by the difference in distance $\Delta d$ between each point of said hyperbola at the emitters $M_1$ and $M_2$, which is computed using the formula $\Delta d = c_1 * dt_1 - c_2 * dt_2 - dt * (c_1 - c_2)$, where dt1 is the difference between the arrival date of the signal originating from M1 as provided by the clock of the receiver, and the sending date of the geolocation signal as indicated in the information signal accompanying said signal, dt2 is the same, for the signal originating from the emitter located at M2, dt is the offset between the clock of the receiver and the clock of the emitters, and c1 and c2 are the propagation speeds of the signals originating respectively from M1 and M2; c1, c2 and dt being known only approximately.

However, using a second, virtual clock internal to the receiver that gives a time that is offset with respect to the actual internal clock of said receiver by the time −dt1, then $\Delta d$ may be recomputed using this new internal clock with which the time difference dt'1 between the sending date of the geolocation signal at $M_1$ as inscribed in the information signal sent at $M_1$ and its arrival time observed with the new clock is zero. $dt'_2$ will be used to denote this difference for the clock originating from $M_2$, and $dt'$ will be used to denote the difference between the clock of the emitters and the new clock of the receiver.

$$d_1-d_2=-c2*dt'_2+dt'*(c_1-c_2)$$

Now, the speeds $c_1$ and $c_2$ greater than c and close to 1 000 293*c are known to within 2 $10^{-4}$, therefore $(c_1-c_2)/c<4$ $10^{-4}$, c being the speed of light in a vacuum and $dt'$ being the time taken by the signal originating from $M_1$ to reach the receiver at M, if the authorized or effective range of the signals is less than for example 299 km, $dt'<300$ $10^3/c$, c being the speed of light in a vacuum, that is to say $3*10^8$ m/s, then $$dt'<1 \ 10^{-3} \text{ seconds}$$

The uncertainty on $d1-d2$ is therefore less than 1 $10^{-3}*4$ $10^{-4}*3$ $10^8=120$ m.

The receiver is therefore contained within a slice delimited by two hyperbolic surfaces revolving about the straight line linking $M_1$ and $M_2$, emission sites of the signals, the two hyperbolas being defined by the points $M_1$ and $M_2$ and a difference in length between the points of the hyperbolas at the two points $M_1$ and $M_2$ of $c_2*dt'_2+/-60$ m.

A smaller range of the signals makes it possible to reduce this uncertainty by the same amount; likewise, the presence, in the signal, of a minimum average speed and of a maximum average speed of the signal to reach any point within its range makes it possible also to reduce the depth of this slice. Finally, the uncertainty may also be reduced by choosing the signals originating from the receivers with the lowest range.

Slices are thus computed for various pairs of emitters, at least three if the altitude is not known, but preferably originating from 4 non-coplanar emitters, this non-coplanarity characteristic being able to be deduced by reading the message accompanying each information signal, this making it possible to locate the emitter of said signal. The fourth non-coplanar emitter specifically makes it possible to reduce the intersection volume of the various slices or to choose the intersection volume of the slices if this intersection gives two different volumes that are symmetrical about the plane of the emitters and no other indicator, such as an external indication regarding the altitude of the receiver, is able to be used to determine in which of the two volumes said receiver is located.

An intersection of these various slices is then computed; to this end, it is possible to compute the intersection coordinates of each surface defining each slice with two other surfaces each defining another slice, using for example a first orthogonal reference frame xyz, the plane xy being the plane of the positions of the first 3 emitters and x being an axis linking the positions of two of the 3 emitters.

The equation of the first hyperbolic surface is:

$$x^2/a^2-(y^2+z^2)/b^2=1$$

A parameter t is used, such that $t=x/a-y/b$
therefore $$t*(x/a+y/b)=1+z^2/b^2$$

therefore $$x/a+y/b=(1+z^2/b^2)/t$$

$$x/a=\frac{1}{2}[(1+z^2/b^2)/t+t]$$

$$y/b=\frac{1}{2}[(1+z^2/b^2)/t-t]$$

The second hyperbolic surface is the result of the rotation, about a directional axis parallel to z and perpendicular to the plane xy, of another hyperbolic surface revolving about the axis x, and therefore has an equation of the form:

$$\alpha x^2+\beta y^2+\gamma xy+\varepsilon z^2=1$$

This equation makes it possible to find one or more values of t for each value of z:

$$\alpha(a*\frac{1}{2}(t+(1+z^2/b^2)/t))^2+\beta*(b\frac{1}{2}(-t+(1+z^2/b^2)/t))^2+\gamma ab*(t^2-(1+z^2/b^2)^2/t^2)/4+\varepsilon z^2=1$$

$$\alpha(a*\frac{1}{2}(t^2+(1+z^2/b^2))^2+\beta*(b\frac{1}{2}(-t^2+(1+z^2/b^2)))^2+\gamma ab*(t^4-(1+z^2/b^2))/4+\varepsilon z^2 t^2=t^2$$

$$\alpha(a*\frac{1}{2}(t^4+(1+z^2/b^2))^2+2*(1+z^2/b^2)*t^2)+\beta*b\frac{1}{2}*(t^4+(1+z^2/b^2)^2-2*(1+z^2/b^2)*t^2)+\gamma ab*(t^4-(1+z^2/b^2))/4+\varepsilon z^2 t^2=t^2$$

$$t^4*(\alpha a/2+\beta*b/2+\gamma ab/4)+t^2*(\alpha a(1+z^2/b^2)-\beta b(1+z^2/b^2)+\varepsilon z^2-1)+\alpha a/2*(1+z^2/b^2)^2+\beta*b/2*(1+z^2/b^2)^2-\gamma ab/4*(1+z^2/b^2)=0$$

which is an equation that makes it possible to give $t^2$ as a function of z and therefore x and y as a function of z. The possibility of finding 4 different values for a single value of z reflects the symmetry of the hyperbolic surfaces about a plane perpendicular to their axis of symmetry, and also about the plane formed by the positions of the three emitters. Verifying each of the solutions by taking into account the sign of the difference $d_1-d_2$ between the distances to the emitters and the position of the receiver with respect to the plane of the emitters makes it possible to find the single intersection of the three surfaces. If no hypothesis is able to be made regarding the position of the receiver with respect to the plane of the emitters, then the computing of the position may be continued for each of the two possibilities, and using a geolocation signal emitted by a fourth emitter that is non-coplanar with the first three, in particular after fine-tuning the computed position, then makes it possible to determine said relative position of the receiver with respect to the plane formed by the positions of the first three emitters.

The Cartesian equation of the third parabolic surface may therefore generate, for each situational hypothesis for the receiver with respect to the plane formed by the positions of the emitters, an equation in terms of z for which the one or more solutions may be found using numerical techniques, in particular through dichotomy.

It is then possible to determine the points of intersection of all of the surfaces for each of the two situational hypotheses for the emitter with respect to the plane formed by the position of the emitters, and then verify that the volume containing the receiver is actually within range of the electromagnetic geolocation signals used, and if not, to use another combination of emitters preferably excluding the emitters computed as being out of range, and so on, until an acceptable combination is found. If the intersection volume consists of the intersection of more than three layers, the relative position of the receiver with respect to the plane defined by the positions of the first three emitters is preferably determined first, preferably choosing, from among the triplets of emitters, those in which the emitters are least aligned, and then the intersections of the three layers with each of the two surfaces defining the fourth layer are defined, said intersections making it possible to compute two volumes that are smaller than the previous volume and to determine in which of said two volumes the receiver is located, and so on for all of the surface intersections in order to finally have a minimum intersection volume. The method of calculating the position of the receiver which has just been described can also be used in the case of a location in two dimensions. In this particular case, the position of the receiver can be obtained by the intersection of a slice as described above and a plane formed by three transmitters.

Also, in an embodiment particularly suitable for two-dimensional localization, the calculation of the position of the receiver can include the steps consisting of:

For at least three transmitters, determine, for at least one couple M1 and M2 of its transmitters, a slice delimited by two hyperbolic surfaces of revolution around the line linking the transmitters M1 and M2, the two hyperbolas being defined by the position of the emitters M1 and M2 and a difference in length of the points of the hyperbolas at the two positions of the emitters M1 and M2, determine the position of the receiver by intersection of said slice and a plane formed by the three transmitters.

Fine-Tuning and Accuracy of the Geolocation

Consulting weather data between each of the emitters selected previously and the volume determined above, or consulting the minimum and maximum average propagation speeds toward this volume, for each of the emitters, and more accurately determining the geolocation of the receiver, makes it possible to further reduce the uncertainty on the propagation speeds of the signals and on the offset between the clock of the receiver and that of the emitters. An accuracy of 60 m on the volume and an uncertainty on the propagation speed of the signals of $2 \cdot 10^{-6}$ rather than $2 \cdot 10^{-4}$ thus makes it possible to reduce the uncertainty of the clock to $60/3 \cdot 10^8 s + 300 \cdot 10^3/3/10^8 * 2 \cdot 10^{-6} = 2 \cdot 10^{-7} + 2 \cdot 10^{-11}$ seconds.

This new accuracy on the clock, as well as the location of the receiver within a reduced volume, then make it possible to perform geolocation computations again using the same measurements on the received signals, but allow signal propagation speeds and a receiver clock that are more accurate. The inaccuracy of the geolocation $dt'*(c_1-c_2)$ is then $2 \cdot 10^{-7} * 3 \cdot 10^8 * 2 \cdot 10^{-6} = 12 \cdot 10^{-7}$ m if c1 and c2 are equal to within uncertainties, or $2 \cdot 10^{-7} * 3 \cdot 10^8 * 4 \cdot 10^{-4} = 24 \cdot 10^{-5}$ m if the two propagation speeds are highly different, for example if the signal travels through a cyclone. The accuracy of the measurement of the arrival time of the signal or the emission time may nevertheless downgrade the accuracy of the geolocation computations.

Computing the Position of a Moving Receiver

If the receiver is moving, the Doppler effect makes it possible to compute the speed component of said receiver parallel to the line linking for example the emitter located at M1 and the receiver. This component of the speed, combined with the propagation speed of the signal around the receiver, and with the duration between the reception of the signal originating from said receiver and the subsequent reception of a signal originating from another emitter makes it possible to compute the time difference between the date of reception of the signal by the receiver if this was located where it is located at the time of reception of the last signal, and the time at which the signal was emitted, this being the case for each emitter other than the last one used for geolocation. The computation then described above for a non-moving receiver may be used to compute the geolocation; in addition, since the location of the receiver is determined, using data regarding its speed originating from the geolocation then makes it possible to compute its speed in the three directions in space.

Moving Emitter

If an emitter is moving when the geolocation signal is emitted, the direction and the norm of the speed of said emitter are preferably provided in the certification message accompanying the geolocation message. After a first geolocation computation performed using a first series of geolocation signals, the projection of the speed onto each of the axes linking the receiver to the various emitters deduced from the Doppler effect is then adjusted by removing therefrom the component on this axis of the speed of the emitter at the time of emission, before being used to compute the speed of the receiver.

Accelerating Receiver

If the receiver is accelerating, it may use the Doppler effect to compute the projection of the speed onto the axis linking it to each of the emitters on two series of successive signals and thus deduce therefrom the speed variation on these axes and therefore the acceleration vector of the receiver. This computation is advantageously used to increase the accuracy of the computation of the abovementioned time difference, which may be performed again, for example on the first series of signals, taking into account the previously computed acceleration in order to determine an even more accurate geolocation. The computation may also be performed again on the second series of signals and thus allow a second more accurate computation of the acceleration. This new acceleration then potentially makes it possible to recompute more accurate speeds for the two series of signals, and then a more accurate acceleration, and so on, until the improvement in the accuracy of the speeds and accelerations is no longer significant for the user.

Resynchronizing the Clock of the Receiver

The computed accuracy advantageously makes it possible to resynchronize the clock of the receiver. A register that stores the inaccuracy of this time may be filled in, and then a computation depending in particular on the accuracies of the measuring apparatuses advantageously makes it possible, at the time when said clock is consulted, to give an updated value of the accuracy of said clock, this time then being able to be used again for a new geolocation if this accuracy is better than that associated with the times computed using the abovementioned methods.

Localization in Enclosed Areas

If the or one of the signals travels through a medium other than air or space, or if the transmission speed of the signals depends on altitude, the weather data may give signal transmission speeds that differ according to altitude, or the depth at which the receiver is located. The receiver may then perform various geolocation computations by taking multiple hypotheses regarding the altitude or the depth at which it is located, these various hypotheses grouping together different average transmission speed values until the intersections of the computed slices overlap at a location compatible with the hypothesis regarding its depth or its altitude, and then use the uncertainty on the depth or the altitude computed for the receiver to examine, based on the recorded medium or the weather data, whether the various values of the average propagation speeds of the signals to these various depths or altitudes vary enough within the domain formed by the intersection of the slices to lead to a difference in the computation of said depth or altitude that is greater than the desired accuracy, and if this is the case, retaking new depth or altitude hypotheses in this limited space or else only computing the geolocation using the data corresponding to the estimated site; and then possibly performing a last computation again using the propagation speed values for this location.

In enclosed environments, the average propagation speed may be altered by materials whose refractive index is far greater than the index of air. Measuring these may thus be difficult, in particular because they are not always obvious. It is therefore possible to measure the average propagation speeds of the waves originating from one or more receivers within a volume and record these measurements, preferably by also recording the accuracy of these data, so as to use them thereafter for accurate geolocation. The recorder may be located using geolocation terminals, for example temporary ones located near to where the measurements are performed or using any other localization technique, for example using lidars or conventional measuring instruments. Using a lidar furthermore makes it possible to determine some or the volumes occupied by air or vacuum and therefore to extrapolate transmission speeds within these volumes, in particular if transmission speed measurements are performed on a surface passing through any concave sub-volume perpendicular to the propagation axis of the wave. Since the refractive index is often variable as a function of temperature, multiple measurements, at least two, will preferably be taken in seasons when the temperature of said materials may be different, for example one in winter and one in summer. These records are advantageously broadcast by local emitters or alternatively by emitters for example on board the receiver or able to be accessed through a server. The use of such measurements by a receiver for a geolocation may be denoted in the certified record of the geolocation, and the system may advantageously decline to certify an underground geolocation or a geolocation in a building with thick walls for which such measurements were not made available to the receiver, or alternatively certify the measurement only by providing it with a special indication such as 'non-adjusted measurement', such a measurement still possibly allowing the location where said geolocation was performed to be retrieved thereafter.

Computing a geolocation in a location for which such a record is not available to the receiver may still use such propagation speed data measured for sites located between the emitter and the receiver to adjust the computation of the average transmission speed of the geolocation signal, for example by hypothesizing on the non-measured part of the space traveled through, this hypothesis being for example that this space is formed by the ground, or by contrast formed of the same materials as those traveled through by the wave up to the site closest to the receiver where the precise measurements were performed and using the same average transmission speed.

Accessing the Average Propagation Speed Data

The average propagation speed data are advantageously accessed by interrogating a server, in the course of which the site with uncertainty thereon is advantageously transmitted to said server.

The receiver may also have a map of the relief, of the surface and of the height of buildings, and of the thickness of the floors and walls and their composition, and possibly of the depth of the underwater surfaces and the propagation speeds of waves in these waters, in these grounds at the various wavelengths liable to be received by said receiver. Using such a map may make it possible to improve the accuracy of the position by making it possible to take into account disturbances and also modifications liable to be experienced by the electromagnetic signals along their path from their emitter to the receiver. The data required to establish such a map may be provided by lidars scanning the terrain, in particular during construction.

The method may comprise computing, in addition to the position of the receiver, time information providing information about the time at which the geolocation and/or certification signals were received.

The method may comprise computing, in addition to the position of the receiver, the speed of the receiver, the direction of said speed and its acceleration vector.

Certification

Preferably, the certification of the geolocation computed using the geolocation signals is granted only after receiving the predetermined number of information and certification signals within the predetermined times.

Before the geolocation is certified, the method may comprise at least one of the following actions:

verifying the digital signatures of the information and certification signals, verifying that none of the certification or information signals comprises any message invalidating the validity of one of the geolocation signals that was used to compute the geolocation, verifying that none of the certification signals comprises any message invalidating the validity of one of the certification signals used to certify said geolocation, or verifying, on the basis of the information and certification signals, that said certification signals are certification signals certifying the geolocation signal, by verifying in particular the identity or the position of the emitter of said certification signal and the time of its sending, in particular the date and its time as inscribed or referenced in the certification and information signals, verifying that the receiver is located within an inspection area inspected by at least one inspection terminal, the information about such areas being provided either by the information signal accompanying the geolocation signal, or by one of the certification signals, or by another communication means such as another radio signal or a Lora or Sigfox network or else a bidirectional communication means such as a 4G, Wi-Fi or satellite communication network connected to the emitters.

The method may furthermore comprise, before certifying the geolocation, verifying that at least one certification signal, preferably all of the certification signals, has been received at times compatible with:

i. the offset between clocks of the emitter of the certification signal and the receiver as determined when receiving the geolocation signal that was emitted by this emitter or when receiving the certification signal, ii. the distance between the receiver and the emitter, for example determined using the geolocation signal emitted by the same emitter, iii. the emission time of the geolocation signal, in particular its emission date and time, as inscribed or indicated in the information signal accompanying the geolocation signal or in another certification signal, or iv. the weather data or wave propagation speed data, known by the receiver, these data being transmitted in the certification signal or accessible by way of a remote server.

The receiver, with a view to certifying its position, may send a message to one or more inspection terminals that make it possible to choose or to determine one or more keys for digitally signing the one or more certification signals.

The receiver preferably carries a private or symmetric encryption key or multiple single-use keys, allowing it to sign its own geolocation computations.

The software of the receiver is preferably equipped with a system for inspecting that its own update is not fraudulent, for example by verifying, before authorizing said update, that the version that is to be installed has been signed digitally by the publisher of said software or by the operator of the geolocation system.

The position of the receiver may be certified using an encrypted hash, in particular using an asymmetric cipher whose private key is stored in the emitters. As an alternative, it is possible to associate with these data a digital signature consisting of the hash of the datum mixed with a secret number also known when said signature is verified.

It is also possible to certify the computed time, the computed speed or the computed acceleration, the certification preferably being performed using an encrypted hash, using an asymmetric cipher whose private key is stored in the emitters. As an alternative, it is possible to associate with these data a digital signature consisting of the hash of the datum mixed with a secret number known when said signature is verified. One method for obtaining the digital signature described above and for verifying it is described for example in WO2020169542.

It is possible to record the computed position of the receiver and the computed time, the accuracy with which these values were computed, and also information relating to the received signals that were used to compute them and the weather data or signal propagation speed data that are used, accompanied by the uncertainty or accuracy of these data; this information potentially being able to be used for a subsequent recomputation of the geolocation.

The computed position of the receiver, the computed time and/or the computed speed and other data that were used to compute them and also their one or more digital signatures may be stored in a storage unit.

As a variant or in addition, these data are transmitted, in plaintext or encrypted form, to a remote server in order to be stored there, the position of the receiver and/or the time and/or the computed speed preferably being stored and/or transmitted with information relating to the accuracy with which this information was computed. The transmission may be performed for example using a wired or wireless Internet network or via a 4G or 5G network or via a Lora or Sigfox network.

The receiver may furthermore also be designed to certify a position, time, speed or acceleration using a certified position and speed deduced from the received signals and various other instruments, in particular an internal clock, acceleration sensor and/or a gyroscope.

In one embodiment, the certification signals are also used as information and geolocation signals.

In this embodiment, the method may comprise the steps in which:

the receiver performs a first computation of its position using the geolocation signals emitted by the emitters, the receiver furthermore performs at least a second and preferably a third computation of its position using the certification signals following the geolocation signals used for the first computation, in the event of failure of at least one of the second and third position computations, the receiver declines to certify the position computed using the geolocation signals, otherwise, the receiver compares said first, second and third computation, in the event of a significant difference, in particular demonstrating an acceleration or a speed of the receiver that are incompatible with nature, in particular non-relativistic, the receiver declines to certify the position, in the absence of a significant difference, the receiver certifies the position obtained using the geolocation signals.

When the certification signals are used as geolocation signals, before certifying the geolocation computed using the geolocation signals, the receiver preferably verifies whether it is able to determine this same geolocation at least twice in a row, but preferably three times in a row, using consecutive certification signals emitted by each of the same emitters emitting the geolocation signals. If the receiver takes into account acceleration for these computations, it may omit taking into account this phenomenon to compute the third geolocation so as not to have to use yet another following signal. The computation of the geolocation performed using the first geolocation signals is preferably used to give the spatial and temporal coordinates of the receiver, whereas the following computation using the certification signals serves to verify that these certification signals have not been jammed by an inspection terminal or a jamming station, and the computation using the third certification signals serves to verify that none of these said second certification signals has been jammed following a malfunction with the inspection system.

Receiver

Another subject of the invention, independently or in combination with the preceding one, is a receiver, in particular for implementing the certification method as defined above.

The receiver may be configured so as to:

receive electromagnetic signals originating from a plurality of emitters and used to compute the geolocation of the receiver, called "geolocation signals", receive additional electromagnetic signals originating from said emitters, determine the geolocation of the receiver by measuring the reception time of the geolocation signals, determine the authenticity of the geolocation on the basis of the additional electromagnetic signals.

Preferably, the additional electromagnetic signals each comprise a digital signature.

Advantageously, the receiver is designed to be able to decode the digital signatures of the additional electromagnetic signals.

The additional electromagnetic signals may comprise signals received following the geolocation signals, called "certification signals".

The additional electromagnetic signals may comprise signals accompanying the geolocation signals, called "information signals".

The information signal accompanying a geolocation signal may comprise data relating to the position of the emitter of said geolocation signal and/or comprising an identifier providing information about the position of the emitter, the information signal preferably comprising temporal information about the date and time of emission of said geolocation signal.

The information signal may furthermore comprise weather data providing information about the weather, in particular pressure, cloud coverage, temperature, hygrometry in an area surrounding the emitter, and/or speed data providing information about the propagation speeds of electromagnetic waves in directions and at distances in which the geolocation signal is liable to be used. Using weather data may make it possible to take into account disruptions liable to be experienced by the geolocation signals and/or the certification signals on their path from their emitter to the receiver. This may make it possible in particular to increase the accuracy in terms of computing the geolocation.

The information signal may furthermore comprise information indicating the time at which the following certification signal should be emitted.

The certification and information signals may each comprise a digital signature of the transported data.

The receiver preferably comprises:

an internal clock a means for communicating with a computer network in order to receive weather information or information about the propagation speed of the geolocation signals and/or certification signals, a means for communicating with a computer network, possibly being the one described above, but possibly also being a directional network allowing data only to be sent, such as a Sigfox or Lora network for transmitting the geolocation data, in particular its position, a means for storing data about environments in which the receiver is liable to be used, in particular data relating to buildings, for example the thicknesses of the partitions and walls thereof and/or the underground, including data about the composition of the grounds and the depth of watercourses, seas, lakes and the salinity of said sites thereof, these data possibly influencing the transmission speed of the signals for the locations in which said receiver is liable to be used; this data storage means possibly also serving to store the geolocations that are performed and in particular during the travel of said receiver, accompanied by time information and information about speed and acceleration, computing means for computing the coordinates and speeds of the emitter using the geolocation and/or certification signals, the data associated with the signals and the data available in said receiver, certification means for verifying the digital signatures, creating digital signatures and possibly encrypting and signing data.

Preferably, the receiver comprises a plurality of reception antennas, for example three of them, in particular magnetic induction-based circular ones, the antennas preferably being placed in orthogonal planes so as to be able to receive signals originating from all directions in space.

The receiver may comprise a detection unit configured so as to detect the reception time of the signals emitted by the emitters, said unit preferably comprising an integrated circuit or an integrated subcircuit, the circuit or the subcircuit preferably being configured so as to operate at a frequency of 60 GHz.

The circuit or the sub-circuit can be configured so as to record the amplitude of the electromagnetic signals received as a function of the time of the clock of the receiver, to allow, in particular an electronic or computer module, to deduce therefrom the reception time of the electromagnetic signals.

The determination of the reception time can be carried out for example by averaging the dates of signal peaks over for example 20 times the period of the corresponding signal. For example, a signal comprising 5 peaks at maximum power and 15 peaks at minimum powers can be dated with the average date of passage of the 5 peaks at maximum power.

The determination of the reception time can be carried out by any other means, in particular by using artificial intelligence.

The receiver may be arranged in any environment, in particular in an indoor environment, in particular inside a building.

The receiver may furthermore be configured so as to receive weather data providing information about the weather in an area surrounding the emitter, and/or about speed data providing information about the propagation speeds of electromagnetic waves in directions and distances in which the geolocation signals are liable to be used, in particular minimum and maximum average propagation speeds of the signals to reach the points in said area surrounding the emitter. These weather and/or speed data may be contained in the information signal accompanying the geolocation signal.

As a variant, the receiver is configured so as to interrogate a server that provides information about the weather data or about the speed data described above.

The receiver may be designed to compute, in addition to its position, time information providing information about the time at which the geolocation and/or certification signals were received.

The receiver may be designed to compute, in addition to its position, the speed of the receiver and/or the emitters in the direction of said speed.

The receiver may be designed to certify its computed position and/or the computed time, for example using a hash, in particular using an asymmetric cipher whose private key is stored in the emitters.

The receiver may be designed to store the computed position of the receiver and/or the computed time in the storage means and/or to transmit these data, in plaintext or encrypted form, to a remote server in order to be stored there, the position of the receiver and/or the time and/or the computed speed preferably being stored and/or transmitted with information relating to the accuracy with which this information was computed. The transmission may be performed for example using a wired or wireless Internet network or via a 4G or 5G network or via a Lora or Sigfox network or else through satellite transmission, in particular desynchronized from the actual measurement of the location.

The receiver may be configured so as to receive at least one signal having a frequency less than 1 GHz, preferably in the long-wave range, in particular having a frequency between 3 kHz and 300 kHz.

Preferably, the receiver is configured so as to receive geolocation and certification signals having a frequency between 30 MHz and 3 GHz, corresponding to wavelengths between 10 cm and 10 m.

The receiver may also be configured so as to receive GPS (Global Positioning System) signals, in particular having a frequency L1 or L2, corresponding to 1575.42 MHz and 1227.60 MHz, respectively.

System

Another subject of the invention, independently or in combination with the preceding one, is a system, in particular for implementing the certification method as defined above.

The system may comprise:

a) a plurality of emitters, each designed to emit electromagnetic signals used for geolocation, called "geolocation signals", and additional electromagnetic signals, b) at least one receiver designed to receive the electromagnetic signals emitted by the emitters and configured so as to:

determine the position of the receiver based on the geolocation signals, and determine the authenticity of the geolocation on the basis of the additional electromagnetic signals.

The system may be designed to:

compute, in addition to the position of the receiver, time information providing information about the time at which the geolocation and/or certification signals were received, and/or the speed and/or the acceleration of the receiver, and certify the position, the speed or the acceleration of the receiver and/or the computed time, for example using a hash, in particular using an asymmetric cipher whose private key is stored in the emitters.

The system may advantageously comprise at least one inspection terminal for verifying the authenticity and the validity of the geolocation signals.

The system may comprise an inspection system as described above. In particular, the inspection system comprises the one or more inspection terminals. The system may comprise one or more jamming stations.

The system may advantageously be designed to deduce, from its clock synchronized by a certified signal, from the position, from the speed and from the certified acceleration, and possibly from an accelerometer, the time, the position, the speed and the acceleration at a time different from the reception time of one of the geolocation signals, the one or more computed data then being able to be certified by said emitter, their accuracy still being adjusted to the accuracy of the clock, and for the computations of position, speed and acceleration, also to the accuracy of the accelerometer.

The system is preferably designed to record, in particular by way of the receiver, the certified computed position of the receiver and/or the computed time in a storage unit of the system and/or to transmit this information, in plaintext or encrypted form, to a remote server in order to be stored there, the computed position of the receiver and/or the computed time and/or the computed speed and acceleration preferably being stored and/or transmitted with information relating to the accuracy with which this information was computed and with information relating to the received signals that were used to compute them.

Emitters

Preferably, the emitters have time-synchronized clocks.

Preferably, the clocks of the emitters take into account the altitude and the speed at which they traveled or were located since their last synchronization in order to compute the time, said computation in particular taking into account clock time flow differentials according to their altitude, as described by the principle of general relativity.

Preferably, at least two emitters emit geolocation and/or certification signals that coincide in time, the two emitters each emitting geolocation signals in different wavelengths.

Preferably, the emitters are designed to emit the geolocation signals with a predefined offset with respect to a given time zone.

At least one emitter may be designed to emit a signal in the long-wave range, in particular having a frequency between 3 kHz and 300 kHz.

At least one of the emitters may be designed to emit a geolocation signal having a frequency less than 1 GHz.

At least one emitter may be designed to emit a signal having a frequency belonging to the HF, VHF, UHF, FM or TV bands.

At least one emitter may be designed to emit a signal having a frequency between 30 MHz and 3 GHz.

At least one emitter is a GPS (Global Positioning System) emitter, emitting in particular geolocation signals having a frequency L1 or L2, corresponding to 1575.42 MHz and 1227.60 MHz, respectively.

In one embodiment, at least one of the emitters is terrestrial, in particular at least one emitter arranged at altitude or on top of buildings such as towers. Such an arrangement makes it possible to increase the accuracy of the geolocation and the measurement of the transmission speed.

As a variant or in addition, at least one emitter is arranged on a satellite, a flying object or an object that floats in the sky, said emitter preferably being designed to emit a signal having a frequency greater than 250 MHz.

In particular, the emitters may be arranged in satellites in geostationary orbit or moving around the Earth.

The fact that emitters are arranged in geostationary orbit makes it possible to improve the accuracy of the transmission speed and altitude data, but limits the wavelengths able to be used to transport the geolocation signals that they emit.

The or some emitters may be configured so as to transmit the geolocation signal directionally, said emitter comprising a directional antenna, for example a dipole antenna and/or at least one director and/or reflector being arranged in the trajectory of the signal emitted by the emitter so as to direct it in a predefined direction.

Each emitter may be configured so as to transmit, with the information signal or with at least one certification signal, data relating to the range of the emitter and the minimum intensity of its signal when it is received, the inspection and non-inspection areas that are within its range, that is to say within the perimeter in which it is able to be received and used.

The emitters may each be designed to transmit information relating to the change of their own position, speed and acceleration, in particular periodically, to the receiver and/or to the inspection terminals, or else to a server to which the inspection terminals are connected.

Other Possible Applications

Certifying Transactions

The invention also relates to a method for certifying a transaction or a payment, wherein the geolocation, or even the time of the transaction or of the payment, is certified by implementing the geolocation certification method according to the invention or using the receiver according to the invention or using the system according to the invention, and the geolocation of the signatories or co-signatories of the transaction or of the payment is optionally certified.

The above method for certifying a transaction or a payment may furthermore comprise the steps of:

if the transaction is performed using two terminals remote from one another, displaying, on one of the terminals or on both of the terminals, the location of the other terminal, —allowing and possibly helping the signatories to enter the address at which they are located when signing, and also the date and time, comparing the geolocation, or even the time of the transaction or of the payment that are computed, with a position, or even with the time of the transaction as declared by the co-signatories, in the event of a difference, declining to certify the transaction or the payment.

Securing Transactions

The invention also relates to a method for securing a transaction or a payment, comprising the steps of:

certifying the geolocation of a receiver associated with a transaction or payment system by implementing the geolocation certification method according to the invention or using the receiver according to the invention or using the system according to the invention, in the event of failure of said certification, or else if the computation of the geolocation is not accurate enough with regard to the geolocation accuracy predefined for said transaction, preventing the transaction or the payment.

Preferably, the computation of the geolocation is not accurate enough with regard to a predefined geolocation accuracy if the computing accuracy is greater than the predefined geolocation accuracy, for example 1 m if the transaction requires a single signatory or 5 cm in horizontal coordinates and 50 cm in vertical coordinates if it requires multiple signatories.

The invention also relates to a method for inspecting a transaction or a payment, wherein the transaction or the payment is conditional on the possibility of geolocating the terminal allowing said transaction or said payment by implementing the geolocation certification method according to the invention or using the receiver according to the invention or using the system according to the invention.

Restricting Spatio-Temporal Use

The invention also relates to a method for restricting the use of a license or a right by a user, wherein:

the user, or even the time and/or the date at which the user requests access, is geolocated by implementing the certification method according to the invention, using the receiver, or using the system according to the invention, it is verified whether the geolocation belongs to a list of authorized positions, or even whether said time and/or the date is within a predetermined time range, and in the event of a negative outcome, preventing use of the license or the right.

The invention also relates to a method for restricting access to data able to be read by an apparatus:

the geolocation of a receiver associated with the apparatus, or even the time and/or the date at which the access was requested, is certified by implementing the method according to the invention, or using the receiver or the system according to the invention, it is verified whether the geolocation belongs to a list of authorized positions, or even whether the time and/or the date is within a predetermined time range, and in the event of a negative outcome, declining access to the data.

Path Tracking

The invention also relates to a method for tracking a path of goods or vehicles, wherein one or more receivers periodically record the certified geolocation, or even the certified time and/or the certified date and/or the certified speed and/or the certified acceleration, of the goods or the vehicle by implementing the method, using the receiver or the system according to the invention.

Alerts

The invention also relates to a position tracking method, in which an alert signal is triggered when the receiver is detected outside or within a predefined area, or leaves or enters same, the alert possibly being acoustic, visual, or subject to a message emitted for example via a Lora, Sigfox or 4G or 5G network.

Clock Synchronization, Underwater Diving, Swimming, Tunneling and Cable and Duct Installation The use of the geolocation certification method according to the invention or using the receiver according to the invention or using the system according to the invention for:

synchronizing remote clocks, underwater diving and swimming, for tunneling or installing cables or underground pipes without digging trenches, preferably using at least two receivers placed at the measuring points, allowing a user to certify their position, in particular if the receiver is equipped with means for entering secret codes or biometric recognition means; such a system being able to emit a legible signature with a few tens of characters, in order to certify the identity, the location and the time of the user, who may then be verified by a correspondent of said user and who is thus able to verify this information, invalidating a transaction, including a payment transaction using a payment means on the basis of the record of the date and time of said transaction, committed after a cancelation; the cancelation possibly being able to lead to the cancelation of the following transactions.

The invention also relates to a method for geolocating a stationary object using a mobile receiver according to the invention, said mobile receiver being geolocated by implementing the method according to the invention, method in which the receiver receives at different times in at least two different places geolocation signals from the stationary object, and calculates the position of the stationary object by implementing the method according to the invention, the method comprising in particular the display of the positions of the mobile receiver in these places, and the position of the immobile object on a map or a plan.

BRIEF DESCRIPTION OF THE DRAWINGS

The invention will be able to be better understood upon reading the following detailed description of non-limiting exemplary implementations thereof, and upon examining the appended drawing, in which.

DETAILED DESCRIPTION

FIG. 1

Figure 1:
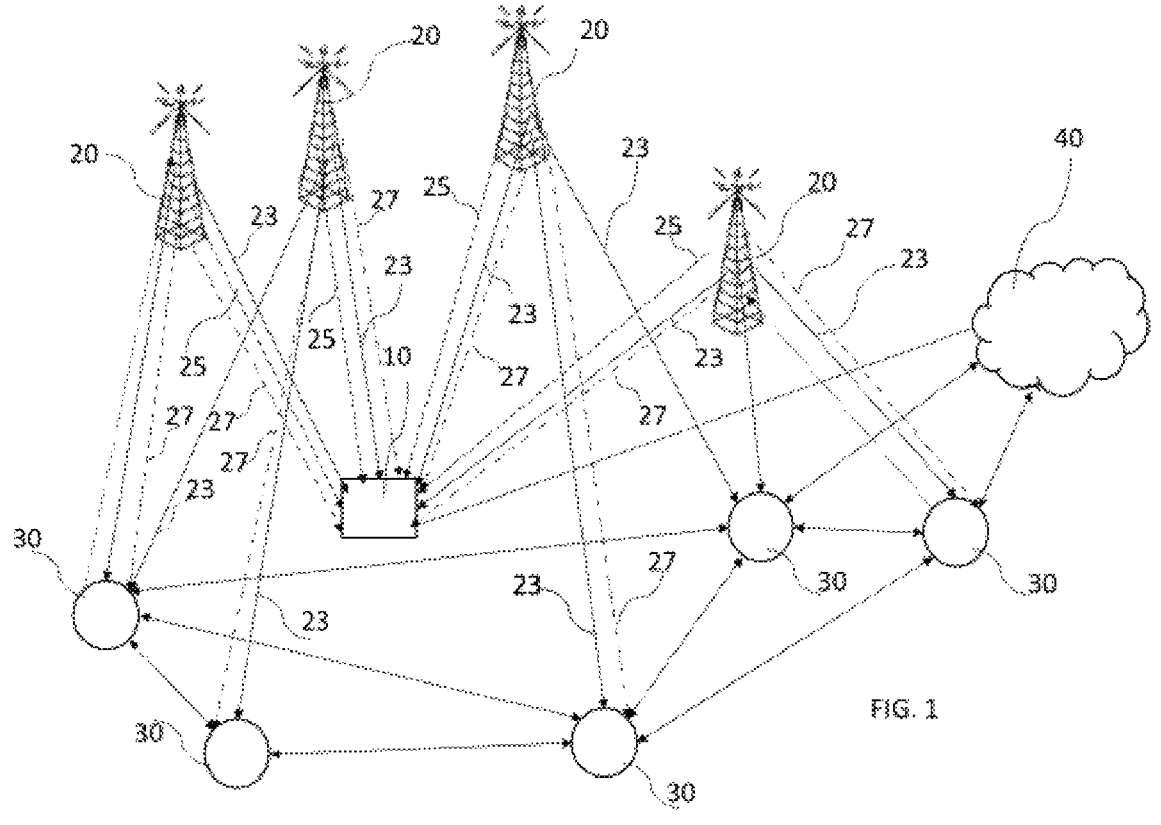
FIG. 1 schematically and partially shows a system for implementing a method for certifying a geolocation according to the invention.

FIG. 1 illustrates one example of a system 1 for implementing a certification method according to the invention.

This system 1 comprises a receiver 10. Preferably, the receiver 10 comprises a plurality of reception antennas, for example three of them, in particular magnetic induction-based circular ones, the antennas preferably being placed in orthogonal planes so as to be able to receive signals originating from all directions in space.

In the illustrated example, the receiver 10 furthermore comprises a detection unit configured so as to detect the reception time of the signals emitted by the emitters, said unit preferably comprising an integrated circuit or an integrated subcircuit, the circuit or the subcircuit preferably being configured so as to operate at a frequency of 60 GHz.

The receiver 10 may be arranged in any environment, in particular in an indoor environment, in particular inside a building.

As illustrated in FIG. 1, the system 1 also comprises a plurality of emitters 20.

The emitters 20 emit electromagnetic signals 23 that are used to compute the position of the receiver 10, called "geolocation signals".

In addition to the geolocation signals 23, the emitters 20 each emit additional electromagnetic signals comprising data used to authenticate the position of the receiver.

The additional electromagnetic signals comprise signals 25 received following the geolocation signals, called "certification signals".

The additional electromagnetic signals comprise signals 27 accompanying the geolocation signals, called "information signals".

The information signal 27 accompanying a geolocation signal 23 comprises data relating to the position of the emitter of said geolocation signal and/or comprising an identifier providing information about the position of the emitter, the information signal preferably comprising temporal information about the date and time of emission of said geolocation signal.

The information signal 27 furthermore comprises weather data providing information about the weather, in particular pressure, cloud coverage, temperature, hygrometry in an area surrounding the emitter, and/or speed data providing information about the propagation speeds of electromagnetic waves in directions and at distances in which the geolocation signal is liable to be used.

As a variant, the weather and speed data are accessible from a remote server 40.

In the illustrated example, the information signal 26 furthermore comprises information indicating the time at which the following certification signal should be emitted.

The certification and information signals each comprise a digital signature of the transported data.

The emitters 20 may be terrestrial. They are for example arranged at altitude or on top of buildings, in particular towers, and preferably at different altitudes.

As a variant, the emitters 20 are arranged on satellites in geostationary orbit or moving around the Earth.

Preferably, these emitters 20 are able to transmit the geolocation signals 23 and the certification signals 25 directionally.

For example, the emitters 20 each comprise a directional antenna, for example a dipole antenna. As an alternative, the emitters 20 each comprise a director and/or reflector arranged in the trajectory of the signal emitted by the emitter so as to direct it in a predefined direction.

FIG. 2

Figure 2:
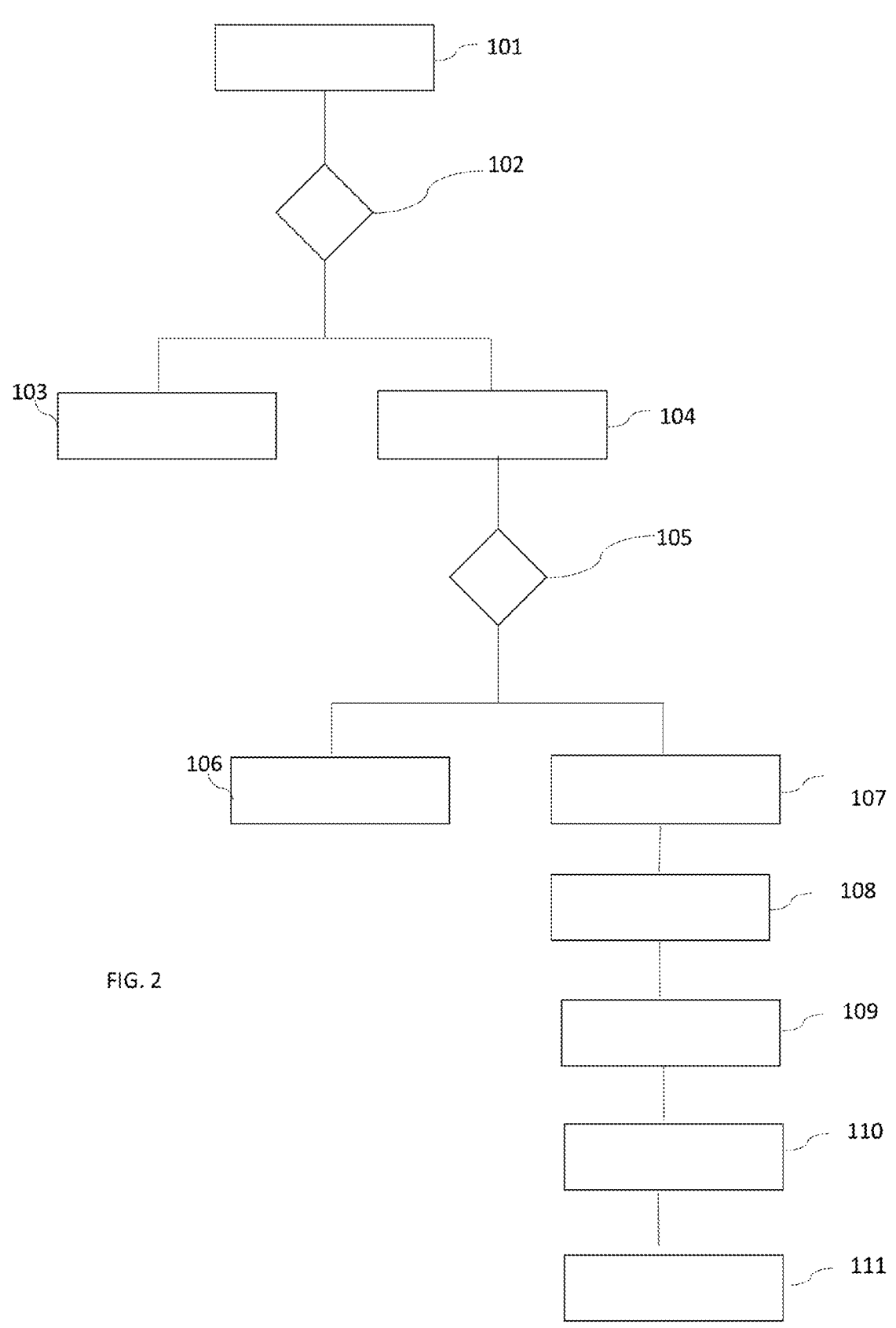
FIG. 2 shows one example of a certification method according to the invention.

A description will be given below, with reference to FIG. 2, of a certification method according to the invention.

Step 101 corresponds to the receiver 10 receiving geolocation signals 23 emitted by the emitters 20.

Prior to, or at the same time as or following step 101, the geolocation signals are analyzed in step 102 with a view to verifying their authenticity. To this end, the system 1 comprises a plurality of inspection terminals 30.

The authenticity of the geolocation signals is verified by each inspection terminal 30 by verifying the digital signature of the information and certification signals, by computing an average transmission speed of the geolocation signals between their emitters and the inspection terminal, and by comparing said computed average transmission speed with a range of possible transmission speeds.

In the example, the range of possible transmission speeds is determined taking into account the weather situation, including in particular atmospheric pressure, temperature and the hygrometry of the spaces traveled through by the signal between its emitter and the inspection terminal.

If the result of the analysis performed for a geolocation signal 23 in step 102 is negative, that is to say if the transmission speed of this signal is not within the range of possible values and/or if all of the data in the message attached to the signal are not valid, then a predefined action for fraudulent signals is triggered in step 103 so as to prevent the emitter emitting the fraudulent geolocation signal from sending a certification signal following this fraudulent signal or the receiver from receiving this certification signal.

In the illustrated example, the predefined action for fraudulent signals comprises jamming, in particular by way of one or more jamming stations associated with the inspection terminal, the certification signal expected by the receiver 10 for certifying the geolocation following the reception of the fraudulent geolocation signal.

In the illustrated example, the jamming is limited to an area Z defined by:

(i) the position of the emitter 20 of the imprecise geolocation signal 23, computed by trilateration using the inspection terminals, and by (ii) a power of the geolocation signal 23, the identified area Z corresponding to an area that has been traveled through by the imprecise geolocation signal with a signal power greater than or equal to a minimum threshold.

The minimum threshold may be predetermined for an emitter of the plurality of emitters, for a group of these emitters, or for all of these emitters, below which threshold the receiver is not able to use said certification signal to certify a geolocation.

By contrast, if the result of the analysis is positive, the receiver receives, in step 104, a first certification signal 25 from each emitter that emitted the geolocation signals 23.

In the same way as for the geolocation signal, the method may comprise a step 105 in which the authenticity of the certification signal is verified by the inspection terminals 30.

If the result of the analysis performed for the certification signal 25 in step 105 is negative, then a predefined action for fraudulent signals in step 106 is triggered in order to prevent the emitter emitting the fraudulent certification signal from sending a second certification signal following this fraudulent signal or the receiver from receiving this second certification signal.

Like the geolocation signal, the predefined action is preferably the jamming of the second fraudulent certification signal.

By contrast, if the result is positive, the receiver receives a second certification signal, in step 107, from each emitter that emitted the geolocation signal and the first certification signal.

The receiver computes its position in step 108 using the geolocation signals if it has not yet been computed. In the illustrated example, the position of the receiver 10 is computed by trilateration.

In this computing step 108, the receiver may furthermore compute time information providing information about the time at which the geolocation and/or certification signals were received.

The method also comprises, in step 108, computing, in addition to the position of the receiver, the speed of the receiver and the direction of said speed.

Preferably, in step 109, the receiver, with a view to certifying its position, computes its position a second and a third time using the first and second certification signals.

The computation using the first certification signals following the geolocation signals is used to verify that these certification signals have not been jammed by an inspection terminal or a jamming station controlled by an inspection terminal.

The computation using the second certification signals makes it possible to verify that the inspection system has not detected any anomaly with its operation during the potential jamming of the first certification signal.

If no problem was detected in these position computations, then the receiver may certify, in step 110, its position computed in step 108 using the geolocation signals.

Preferably, the position of the receiver may be certified using an encrypted hash using an asymmetric cipher whose private key is stored in the emitter 20.

Step 110 also comprises certifying the computed time and/or the computed speed of the receiver, the certification is preferably performed using an encrypted hash, using an asymmetric cipher whose private key is stored in the emitters 20.

Step 111 comprises storing the computed position of the receiver and the computed time, along with information relating to the received signals that were used to compute them.

The storage is performed in a storage unit of the system, in particular of the receiver.

As a variant, this information is transmitted to a remote server 40 in order to be stored there.

In the illustrated example, the position of the receiver and/or the time and/or the speed of the receiver are stored and/or transmitted with information relating to the accuracy with which this information was computed.

This information may be stored and/or transmitted with information relating to the received geolocation signals that were used to compute it.

FIG. 3

Figure 3:
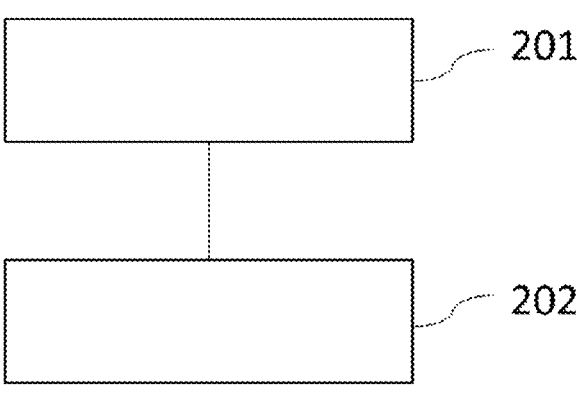
FIG. 3 is a block diagram illustrating various steps of one example of a method implementing the certification method of FIG. 2.

FIG. 3 illustrates one example of a method for securing a transaction according to the invention.

As illustrated, in step 201, the position of a receiver associated with a transaction system is computed and certified by implementing the certification method described above.

In the event of failure to compute said position or to certify the position, the transaction is prevented in step 202.

FIG. 4

Figure 4:
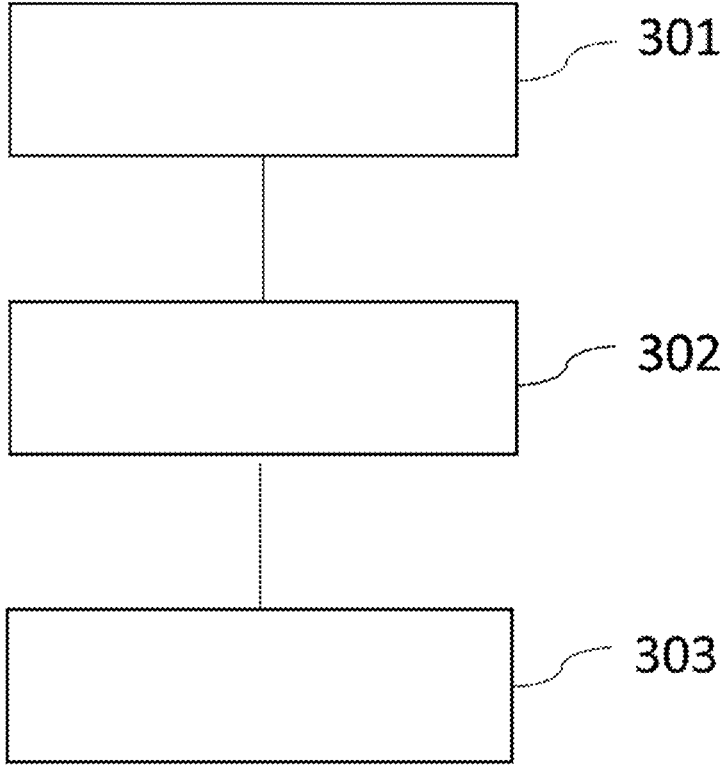
FIG. 4 is a block diagram illustrating various steps of one example of a method implementing the certification method of FIG. 2.

FIG. 4 illustrates a method for restricting the use of a license or a right by a user according to the invention.

This method comprises, in step 301, determining the certified position of the user, or even the time at which the user requests access, by implementing the certification method described above.

In step 302, it is verified whether this position belongs to a list of authorized positions, or even whether said time is within a predetermined time range.

If not, the use of the license or the right is prevented, this corresponding to step 303.

FIG. 5

Figure 5:
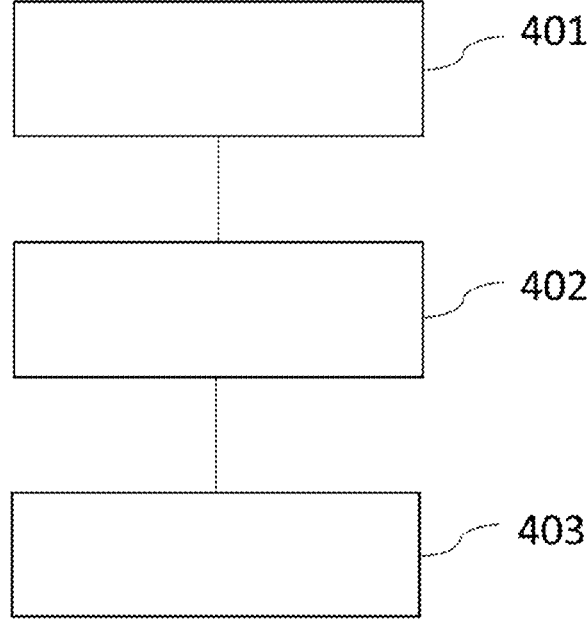
FIG. 5 is a block diagram illustrating various steps of one example of a method implementing the certification method of FIG. 2.

FIG. 5 illustrates a method for restricting access to data able to be read by an apparatus according to the invention.

This method comprises, in step 401, certifying the geolocation of a receiver associated with the apparatus and the time at which access was requested by implementing the certification method described above.

In step 402, it is verified whether the geolocation belongs to a list of authorized positions, or even whether said time is within a predetermined time range, and If not, access to the data is declined in step 403.

FIG. 6

Figure 6:
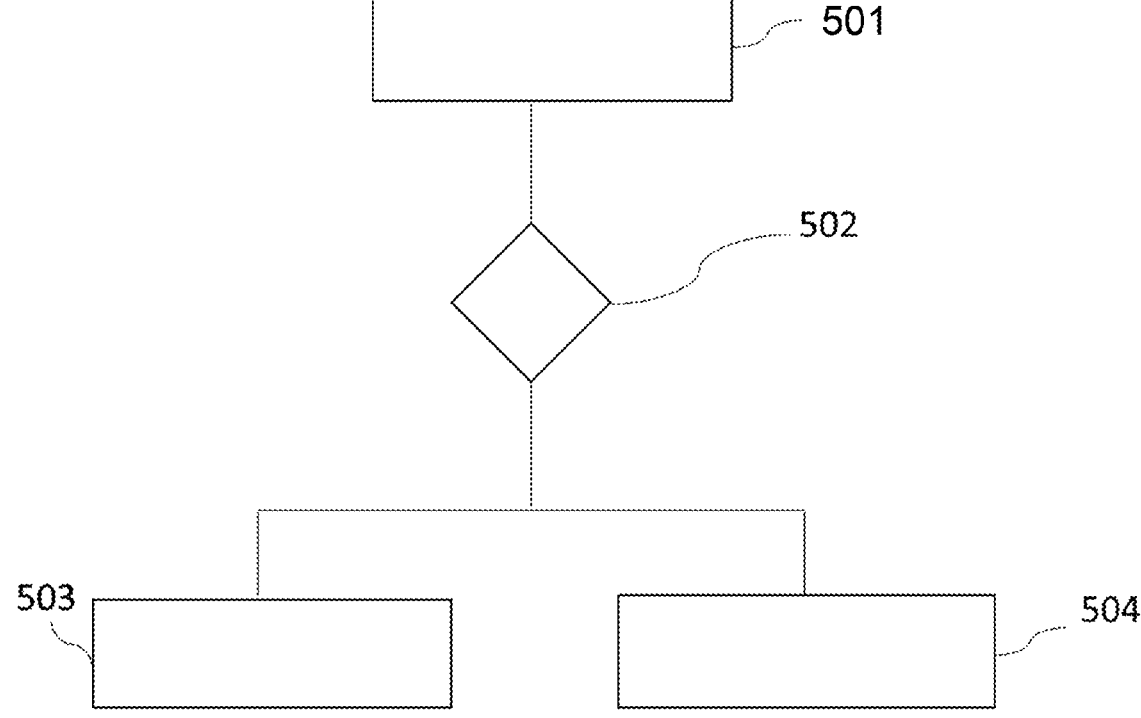
FIG. 6 is a block diagram illustrating various steps of one example of a method implementing the certification method of FIG. 2.

FIG. 6 illustrates one example of a method for certifying a transaction according to the invention.

In step 501, the geolocation of the transaction, or even the time of the transaction, is certified by implementing the geolocation certification method according to the invention and optionally the geolocation of the co-signatories of the transaction is certified.

In step 502, the computed geolocation, or even the computed time of the transaction, is compared with a geolocation, or even a transaction time declared by the co-signatories, and optionally the geolocation of the co-signatories of the transaction is compared with a declared geolocation of the co-signatories.

In the event of a difference, the certification of the transaction is declined in step 503.

In the opposite case, the transaction is certified in step 504.

Of course, the invention is not limited to the described examples.

The invention claimed is:

1. A system, comprising a plurality of emitters, each designed to emit electromagnetic signals used for geolocation, called "geolocation signals", at least one receiver being an inspection terminal designed to receive the electromagnetic signals emitted by the emitters and configured so as to:

determine the position of the receiver based on the geolocation signals, and verify the authenticity and the validity of the geolocation, and one or more jamming stations communicating with or linked to said at least one inspection terminal and being configured to jam one or more electromagnetic signals sent by at least one of the emitters after a fraudulent geolocation signal has been detected, the one or more electromagnetic signals that are jammed are limited to a configurable subset of electromagnetic signals following the fraudulent geolocation signal that was detected.

2. A method for certifying a transaction or a payment, wherein: the geolocation of the transaction or of the payment, is certified by using the system according to claim 1.

3. A method for securing a transaction or a payment, comprising the steps of:

certifying the geolocation of a receiver associated with a transaction or payment system by using the system according to claim 1, in the event of failure of said certification, or else if the computation of the geolocation is not accurate enough with regard to a geolocation accuracy predefined for said transaction, preventing the transaction or the payment.

4. A method for inspecting a transaction or a payment performed using two terminals remote from one another, wherein it is possible to display, on one of the terminals or on both of the terminals, the location of the other terminal, by using the system according to claim 1.

5. A method for restricting the use of a license or a right by a user, wherein:

the geolocation of the user, or even the time and/or the date at which the user requests access, are certified by using the system according to claim 1, it is verified whether the geolocation belongs to a list of authorized positions, and/or whether said date and/or time is within a predetermined time range, and in the event of a negative outcome, preventing use of the
license or the right.

6. A method for restricting access to data able to be read
by an apparatus:

the geolocation of a receiver associated with the apparatus, or even the time and/or the date at which the access
was requested, are certified by using the system according to claim 1, it is verified whether the geolocation belongs to a list of
authorized positions, or even whether said time and/or
the date is within a predetermined time range, and in the event of a negative outcome, declining access to the
data.

7. The system according to claim 1, wherein each emitter
of said plurality of emitters is designed to emit additional
electromagnetic signals, the authenticity and the validity of
the geolocation being verified on the basis of said additional
electromagnetic signals.

8. The system according to claim 1, wherein the one or
more electromagnetic signals that are jammed are limited to
a first electromagnetic signal following the fraudulent geolocation signal that was detected, the first electromagnetic
signal being a first certification signal, and said at least one
inspection terminal causing the one or more jamming stations to jam the one or more electromagnetic signals.

\* \* \* \* \*